…

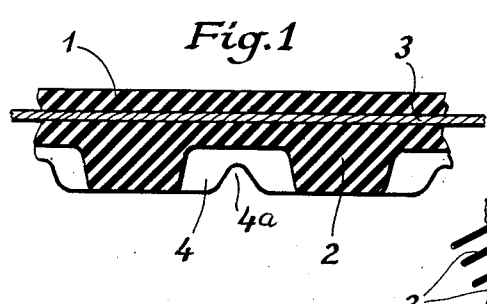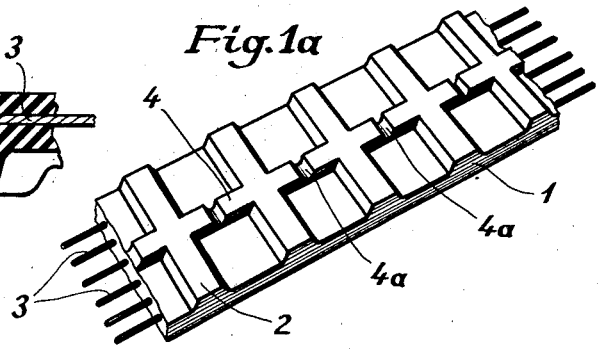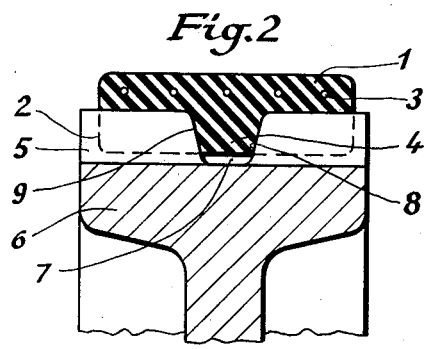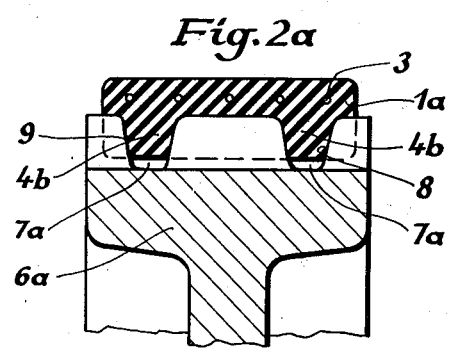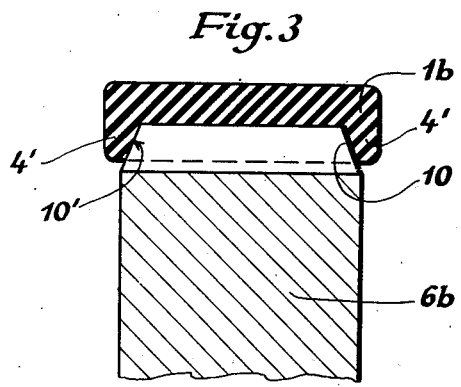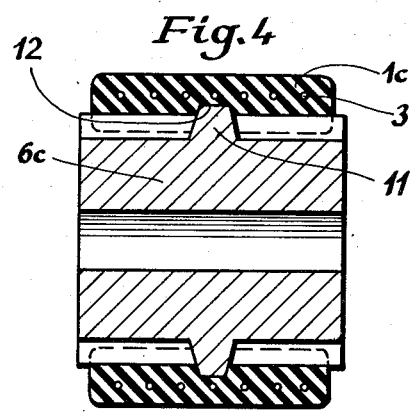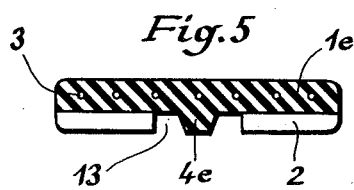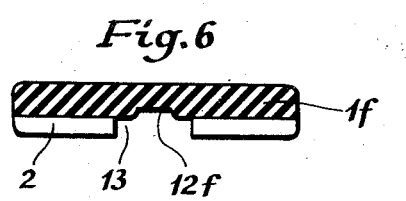

United States Patent Office 2,770,977
Patented Nov. 20, 1956

2,770,977
BELT TRANSMISSIONS

Richard Beckadolph, Grasdorf Hannover, and Walter Niclas, Altwarmbuchen Uber Hannover, Germany, assignors to Continental Gummi-Werke Aktiengesellschaft, Hannover, Germany Application November 27, 1953, Serial No. 394,840

4 Claims. (Cl. 74—229)

The present invention relates to belt transmissions comprising a belt of rubber or similar material and being provided with teeth.

It is well-known to produce gearing for cast or cast steel wheels by non-cutting shaping operations only. Such wheels or gears are cheap in production but can be used only in slow running drives. It is further known to arrange belts provided with spur teeth and made of rubber or similar material, for cooperation with corresponding toothed pulleys. Such an arrangement has the great advantage that it is free from slipping which advantage is brought about by the meshing of the teeth of the belt which have a precise pitch with the teeth of the pulleys. Minor inaccuracies in the pitch and the flanks of the teeth of the pulleys are compensated by the elasticity of the belt. It was, therefore, assumed that in many cases transmissions requiring a constant transmission ratio could be replaced by belt transmissions with teeth equipped belts. However, it has been found that inaccuracies in the gearing of the pulleys caused by the casting and unavoidable in view of technological conditions associated with the casting technique were frequently the cause of breakdowns in operation of such transmissions. Thus, especially at high circumferential velocities, a jumping off or running off of the belt was encountered so that such belt transmissions could heretofore not be employed to a great extent, and it was necessary to use precisely machined relatively expensive pulleys the widths of which had to be considerably wider than the width of the employed belt.

It is, therefore, an object of the present invention to provide a toothed belt transmission which will overcome the above mentioned drawbacks.

It is another object of this invention to provide a toothed belt transmission which will make it possible to allow the cooperation of toothed belts with cast pulleys at high speeds of the latter.

It is still another object of this invention to provide a toothed belt transmission arrangement which even if the pulleys over which the toothed belt runs should not precisely be aligned with each other, will prevent said belt from running off said pulleys.

These and other objects and advantages of the invention will appear more clearly from the following specification in connection with the accompanying drawings in which:

Fig. 1 represents a longitudinal section through a toothed belt according to the invention.

Fig. 1a shows the belt of Fig. 1 seen from the bottom thereof.

Fig. 2 shows an embodiment of a pulley-belt arrangement according to the present invention.

Fig. 2a is a slight modification over the arrangement of Fig. 2.

Figs. 3 and 4 show further toothed belt-pulley arrangements according to the present invention.

Fig. 5 is a cross-section through a further embodiment of a toothed belt according to the invention.

Fig. 6 is a cross-section through still another toothed belt of the present invention.

General arrangement

In order to make it possible to allow cast pulleys satisfactorily to cooperate with toothed belts even at high speeds of said pulleys, the contact side of the toothed belt has, according to the present invention, been provided with guiding means extending in the longitudinal direction of the belt and consisting for instance of a guiding bead for engagement with a corresponding circumferential groove on the pulley. Instead of providing the guiding bead on the belt and the groove cooperating therewith on the pulley, also the opposite arrangement may be employed namely to provide the belt with a longitudinal groove for engagement with a circumferential bead or elevation on the pulley.

According to a further development of the invention, the side faces of the beads or elevations may be beveled so that, even when the pulleys are not in proper alignment with each other, it will be possible to use said pulleys in cooperation with a toothed belt. The beads, the cross-sections of which are somewhat similar to the cross-sections of V-belts, bring about that due to the beveled side faces of the guiding means or beads of said belt, the latter will while moving onto the pulley be pulled into its proper position. Furthermore, the beveled side faces of the guiding beads have the advantageous contributory effect that the guiding bead will take up a portion of the circumferential forces to be conveyed.

Structural arrangement

Referring now to the drawing in detail and Fig. 1 thereof in particular, the belt 1 shown therein which may be of rubber or similar material is provided with teeth 2. The forces acting in longitudinal direction of the belt and to be transmitted thereby are taken up primarily by pulling elements 3 such as strands of flexible steel wire or the like. The invention, however, is not limited to any special construction of the belt so that also belts made up in a different manner and with various inserts and reinforcements may be used in connection with the present invention. According to the present invention, the belt 1 is provided with a longiutdinally extending elevation or guiding bead 4 which within the range of the tooth spaces may be provided with recesses 4a as shown in Figs. 1 and 1a in order to increase the flexibility of the belt. Such recesses, however, are by no means indispensable.

According to Fig. 2, the teeth 2 of the belt 1 correspond to and mesh with the teeth 5 of a pulley 6. The guiding bead or elevation 4 which engages a circumferential groove 7 in the pulley 6 prevents the belt 1 from running off the pulley. The shape and arrangement of the toothed belt-pulley engagement as shown in Fig. 2 has proved particularly advantageous. However, it is also possible to provide the belt 1a with a plurality of guiding beads or elevations 4b (Fig. 2a) in which instance the pulley 6a is provided with a corresponding number of circumferential grooves 7a for cooperation with the beads 4b. The slant side faces of the beads 4b are designated by the reference numeral 8, while the flanks of the groove 7a cooperating with the beveled side faces 8 are designated with the reference numeral 9.

According to the modification shown in Fig. 3, each longitudinal side of the belt 1b is provided with a bead 4' the inner beveled side faces 10' of which engage and cooperate with the beveled side faces 10 of the pulley 6b. Also this arrangement safely prevents the belt from running off its pulley.

The embodiment shown in Fig. 2 has the advantage that the belt can be of relatively small width, whereas the embodiment of Fig. 3 has the advantage that the circumferential groove 7, which is either formed simultaneously with the casting or which is subsequently machined into the pulley, will be superfluous.

According to another embodiment of the invention as shown in Fig. 4, the pulley 6c is provided with a continuous guiding bead 11 which engages a corresponding longitudinal groove 12 provided in the belt 1c. This arrangement has the advantage over the arrangements according to Figs. 1 to 3 that the belt can also cooperate with pulleys of relatively small diameter because the flexibility of the belt is not reduced by the guiding bead between the teeth.

Fig. 5 shows a cross-section through a toothed belt 1e provided with a guiding bead 4e for cooperation with a corresponding groove in a pulley. On the other hand, the belt 1f shown in Fig. 6 is provided with a longitudinal groove 12f for cooperation with a correspondingly shaped elevation on the respective pulley. As will be seen from Figs. 5 and 6, a tooth-free area 13 is provided on both sides of the bead 4e and groove 12f respectively. To provide such free area 13 has proved particularly advantageous with regard to the manufacture of the belt and the pulleys and molds therefor as a result of which considerably improved running properties of such belts and pulleys are obtained.

It may also be mentioned that the arrangement of a guiding bead 4, 4a, 4b, 4e, 11 is not to be limited solely to pulleys which have been cast. While with such pulleys the invention has proved particularly advantageous the guiding bead and guiding groove arrangements according to the present invention may also be used in connection with pulleys which have machined teeth, particularly if a longer service life of the toothed belt is desired.

It is, of course, understood that the present invention is by no means limited to the particular constructions shown in the drawings but also comprises any modifications within the scope of the appended claims.

What I claim is:

1. In combination with an endless flat belt of rubber or rubber-like material: a rotatable pulley engaging said belt and having its circumferential area provided with a a plurality of rows of teeth, said teeth respectively extending substantially parallel to the axis of rotation of said pulley, and the teeth of one row being in alignment with the teeth of another row, said rows of teeth being separated from each other by a circumferential central groove extending in a continuous uninterrupted manner around the entire pulley, said belt having its inner surface provided with permament teeth evenly spaced from each other in circumferential direction and respectively extending substantially perpendicular to the longitudinal direction of said belt for meshing with the teeth of said pulley, the inner surface of said belt being provided with a central permanent bead directly intersecting the teeth of said belt and extending in longitudinal direction of said belt in substantial alignment with said circumferential groove, said bead and the teeth of said belt being integral with each other and with said belt and consisting of the same material as the latter.

2. A belt transmission according to claim 1, in which the bead portions intermediate each two successive teeth of the belt are respectively provided with notches to increase the flexibility of said belt, said notches having a depth less than the height of said bead.

3. In combination with an endless flat belt of rubber or rubber-like material: a rotatable pulley engaging said belt and having its circumferential area provided with two rows of teeth, said teeth respectively extending substantially parallel to the axis of rotation of said pulley, and the teeth of one row being in alignment with the teeth of the other row, said rows of teeth being separated from each other by a circumferential central groove extending in a continuous uninterrupted manner around the entire pulley, said belt having its inner surface provided with permanent teeth evenly spaced from each other in circumferential direction and respectively extending substantially perpendicular to the longitudinal direction of said belt and in an uninterrupted manner substantially over the entire width of said belt for meshing with the teeth of said pulley, the inner surface of said belt being provided with central bead sections respectively arranged intermediate each two adjacent teeth of said belt and interconnecting the same, the height of said teeth and the height of said bead sections being substantially the same.

4. A belt transmission according to claim 3, in which the width of the teeth of said belt is considerably greater than the width of said bead sections.

References Cited in the file of this patent

UNITED STATES PATENTS

| | | |
|---|---|---|
| 207,626 | Sargent | Sept. 3, 1878 |
| 1,456,458 | Nordell | May 22, 1923 |
| 1,805,442 | Wallfisch | May 12, 1931 |
| 1,840,081 | Breer | Jan. 5, 1932 |
| 2,397,312 | Forrest | Mar. 26, 1946 |
| 2,471,969 | Meyer | May 31, 1949 |
| 2,534,679 | Place | Dec. 19, 1950 |

FOREIGN PATENTS

| | | |
|---|---|---|
| 302,747 | Germany | Dec. 20, 1917 |
| 435,039 | Italy | May 7, 1948 |
| 453,999 | Great Britain | Sept. 22, 1936 |